US009852499B2

(12) United States Patent
Ming et al.

(10) Patent No.: US 9,852,499 B2
(45) Date of Patent: Dec. 26, 2017

(54) AUTOMATIC SELECTION OF OPTIMUM ALGORITHMS FOR HIGH DYNAMIC RANGE IMAGE PROCESSING BASED ON SCENE CLASSIFICATION

(71) Applicant: KONICA MINOLTA LABORATORY U.S.A., INC., San Mateo, CA (US)

(72) Inventors: Wei Ming, Cupertino, CA (US); Xiaonong Zhan, Foster City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 565 days.

(21) Appl. No.: 14/105,652

(22) Filed: Dec. 13, 2013

(65) Prior Publication Data
US 2015/0170389 A1 Jun. 18, 2015

(51) Int. Cl.
*G06K 9/36* (2006.01)
*G06T 5/50* (2006.01)
(Continued)

(52) U.S. Cl.
CPC ............ *G06T 5/50* (2013.01); *G06K 9/00684* (2013.01); *G06T 5/009* (2013.01);
(Continued)

(58) Field of Classification Search
CPC G06T 5/007; G06T 5/009; G06T 5/50; G06T 7/0022; G06T 2207/10016;
(Continued)

(56) References Cited

U.S. PATENT DOCUMENTS 7,555,165 B2 * 6/2009 Luo .................... G06K 9/00664
382/165
2008/0247665 A1 * 10/2008 Hsu ........................ G06T 5/009
382/274
(Continued)

FOREIGN PATENT DOCUMENTS

JP 2007-515703 6/2007
JP 2008-289092 11/2008

OTHER PUBLICATIONS

Cadik et al., "Evaluation of HDR tone mapping methods using essential perceptual attributes", Jun. 2008, Elsevier, Computers & Graphics, vol. 32, iss. 3, p. 330-349.*
Mertens et al. "Exposure Fusion: A Simple and Practical Alternative to High Dynamic Range Photography", Sep. 2008, Wiley Online Library, Computer Graphics forum, vol. 28, No. 1, p. 161-171.*
(Continued)

*Primary Examiner* — Stephen R Koziol
*Assistant Examiner* — Timothy Choi
(74) *Attorney, Agent, or Firm* — Chen Yoshimura LLP

(57) ABSTRACT

A method for processing high dynamic range (HDR) images by selecting preferred tone mapping operators and gamut mapping algorithms based on scene classification. Scenes are classified into indoor scenes, outdoor scenes, and scenes with people, and tone mapping operators and gamut mapping algorithms are selected on that basis. Prior to scene classification, the multiple images taken at various exposure values are fused into a low dynamic range (LDR) image using an exposure fusing algorithm, and scene classification is performed using the fused LDR image. Then, the HDR image generated from the multiple images are tone mapped into a LDR image using the selected tone mapping operator and then gamut mapped to the color space of the output device such as printer.

13 Claims, 2 Drawing Sheets

(51) Int. Cl.
*G06T 5/00* (2006.01)
*G06K 9/00* (2006.01)

(52) U.S. Cl.
CPC ............... *G06T 2207/10016* (2013.01); *G06T 2207/10144* (2013.01); *G06T 2207/20016* (2013.01); *G06T 2207/20208* (2013.01); *G06T 2207/20221* (2013.01); *G06T 2207/30201* (2013.01)

(58) Field of Classification Search
CPC . G06T 2207/10144; G06T 2207/10004; G06T 2207/20016; G06T 2207/20208; G06T 2207/20221; G06T 2207/30201; G06K 9/00664; G06K 9/00684; G06K 9/00691; G06K 9/00
See application file for complete search history.

(56) References Cited

U.S. PATENT DOCUMENTS

| | | | |
|---|---|---|---|
| 2008/0291476 A1 | 11/2008 | Higuchi | |
| 2008/0292181 A1* | 11/2008 | Kasai | H04N 1/32128 382/159 |
| 2008/0292196 A1* | 11/2008 | Jain | G06F 17/30265 382/225 |
| 2013/0335556 A1* | 12/2013 | Saha | G06K 9/00664 348/135 |

OTHER PUBLICATIONS

Spaulding et al., "UltraColor: a new gamut-mapping strategy" Feb. 1995, Proc. SPIE vol. 2414, Device-Independent Color Imaging II, p. 61-68.*
Drago et al., "Adaptive Logarithmic Mapping for Displaying High Contrast Scenes", Eurographics 2003, vol. 22, No. 3, 2003.
Reinhard et al., "Photographic Tone Reproduction for Digital Images", ACM Transactions on Graphics, 2002.
Kuang et al., "iCAM06: A refined image appearance model for HDR image rendering", Journal of Visual Communication Image Representation, R. 18, 007, pp. 406-414.
Mertens et al., "Exposure Fusion", Proceedings of the Pacific Conference on Computer Graphics and Applications, Pacific Graphics 2007. pp. 382-390.
Ghomsheh et al., "A New Method for Indoor-outdoor Image Classification Using Color Correlated Temperature", International Journal of Image Processing (IJIP), vol. 6, Issue (3), 2012, pp. 167-181.
Reinhard et al., "Dynamic Range Reduction Inspired by Photoreceptor Physiology", IEEE Transactions on Visualization and Computer Graphics, 2005, 11, pp. 13-24.
Durand et al., "Fast Bilateral Filtering for the Display of High-Dynamic-Range Images", ACM Transactions on Graphics, 2002, 21, 3, pp. 257-266.
Benoit et al., "Using Human Visual System Modeling for Bio-Inspired Low Level Image Processing", Elsevier, Computer Vision and Image Understanding, 114, 2010, pp. 758-773.
Japanese Office Action, dated Dec. 20, 2016, in a counterpart Japanese patent application, No. JP 2014-246465.
Chinese Office Action, dated May 3, 2017, and Search Report dated Apr. 24, 2017, in a counterpart Chinese patent application, No. CN 201410767053.6.

* cited by examiner

AUTOMATIC SELECTION OF OPTIMUM ALGORITHMS FOR HIGH DYNAMIC RANGE IMAGE PROCESSING BASED ON SCENE CLASSIFICATION

BACKGROUND OF THE INVENTION

Field of the Invention

This invention relates to high dynamic range (HDR) image processing, and in particular, it relates to automatically selecting optimum tone mapping operators and gamut mapping algorithms based on scene classification.

Description of Related Art

High dynamic range (HDR) imaging is a technique used in image processing and digital photography to handle sources that have extremely large ranges of brightness (light intensity). For example, an outdoor scene in daylight may include blue sky and sunlit objects as well as objects in shadows; a night scene may include neon lights and brightly lit objects as well as poorly lit objects; an indoor scene may include bright windows as well as darker areas, etc. These scenes pose a challenge for imaging devices such as digital cameras; the dynamic range of the image sensor of currently available digital cameras often cannot adequately image such scenes. If the exposure level is adequate for capturing details of darker areas of the scene, the brighter areas will often be overexposed with details lost; conversely, if the exposure level is adequate for capturing details of brighter areas of the scene, the darker areas will often be underexposed with details lost.

HDR imaging techniques deal with this problem by taking multiple images of the same scene at various exposure levels (referred to as exposure bracketing), and then digitally merging or combining the multiple images to create an HDR image that contains information from the original multiple images, so that details in both brighter and darker areas are adequately expressed in the HDR image. Methods for creating an HDR image from multiple images (referred to as brackets) are generally known; the process typically involves aligning the multiple images, removing ghosts in the multiple images (ghosts may appear when an object in the scene moved during the taking of the multiple images), and merging the multiple images to form the HDR image.

In order to print an HDR image by a printer, the image must first be rendered into colors supported by the printer. Typically, the range of colors that it is possible to produce on a printer, with ink or toner, is much smaller than the range contained in an HDR image. For example, an HDR image may have a dynamic range of 100,000:1 while an image for printing by a printer may have a tonal value ranging from just 1 to 255. During printing, the much greater range of colors in the HDR image must be fitted into the smaller range that it is possible to print. This conversion includes tone mapping, which converts the tonal value of an image from a high dynamic range (HDR) to a lower dynamic range (LDR), and gamut mapping, which converts the LDR image from the RGB (red, green, blue) color space to the CMYK (cyan, magenta, yellow, black) color space for printing. Various tone mapping algorithms are known.

Scene classification or image classification has been used in image processing. For example, methods for classifying scenes into indoor and outdoor scenes have been proposed.

SUMMARY

It is observed that no single tone mapping algorithm works best for every type of images. For example, it is observed that the Drago tone mapping operator (see, e.g., F. Drago, K. Myszkowski, T. Annen, N. Chiba, "Adaptive Logarithmic Mapping For Displaying High Contrast Scenes", Computer Graphics Forum, 2003, 22, 419-426) tends to work best for images of outdoor scene with landscape, the Reinhard02 tone mapping operator (see, e.g., Photographic Tone Reproduction for Digital Images, E. Reinhard, M. Stark, P. Shirley, and J. Ferwerda In ACM Transactions on Graphics, 2002) tends to work best for images of outdoor scene with people, and iCAM06 tone mapping operator (see, e.g., Kuang, J., Fairchild, M. D., iCAM06, HDR, and Image Appearance, IS&T/SID 15th Color Imaging Conference, 2007) tends to work best for images of indoor scene. The inventors recognized that a method that automatically selects an optimum tone mapping operator based on a classification of the type of scene of the image would enhance HDR image processing.

Accordingly, the present invention is directed to a method for automatically selecting a tone mapping operator and gamut mapping algorithm for HDR image processing.

An object of the present invention is to enhance the quality of images printed from an HDR image.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a data processing apparatus for processing a set of multiple input images of a scene taken at various exposure values, which includes: (a) using one or more of the multiple input images, classifying the scene into one of a plurality of scene classes; (b) based on the scene class determined in step (a), selecting one of a plurality of pre-stored tone mapping operators; (c) merging the multiple input images to generate a high dynamic range (HDR) image; and (d) tone mapping the HDR image using the tone mapping operator selected in step (b) to generate a low dynamic range (LDR) image.

Step (a) may include: (a1) selecting a subset of two or more images from the multiple input images; (a2) fusing the selected subset of images into a single fused image, by generating a weight map for each selected image and combining the selected images using the weight maps, the weight maps being generated from one or more of saturation, contrast, and well-exposedness of each pixel in each selected image; and (a3) classifying the fused image into one of a plurality of scene classes.

The method may further include: (e) based on the scene class determined in step (a), selecting one of a plurality of pre-stored gamut mapping algorithms; and (f) using the gamut mapping algorithm selected in step (e), converting the LDR image generated in step (d) from a color space of the image to a color space of an output device.

In one example, the plurality of scene classes includes a class of scenes that contains a significant presence of people, a class of outdoor scenes and a class of indoor scenes. The presence of people may be determined by face recognition techniques. Outdoor vs. indoor scenes may be classified using correlated color temperatures of the image.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

In yet another aspect, the present invention provides a digital camera having the computer usable non-transitory medium mentioned above, and further including: an imaging section for obtaining images; and a control section for controlling the imaging section to obtain the set of multiple images having different exposure levels.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention use scene classification to automatically select an optimum tone mapping operator and an optimum gamut mapping algorithm for HDR image processing. In one particular embodiment, scenes are classified into three classes, namely outdoor scenes without people, indoor scenes without people, and scenes with people (both outdoor and indoor); three tone mapping operators, namely Drago, iCAM06 and Reinhard02 are used for these three classes of scenes, respectively.

Figure 1:
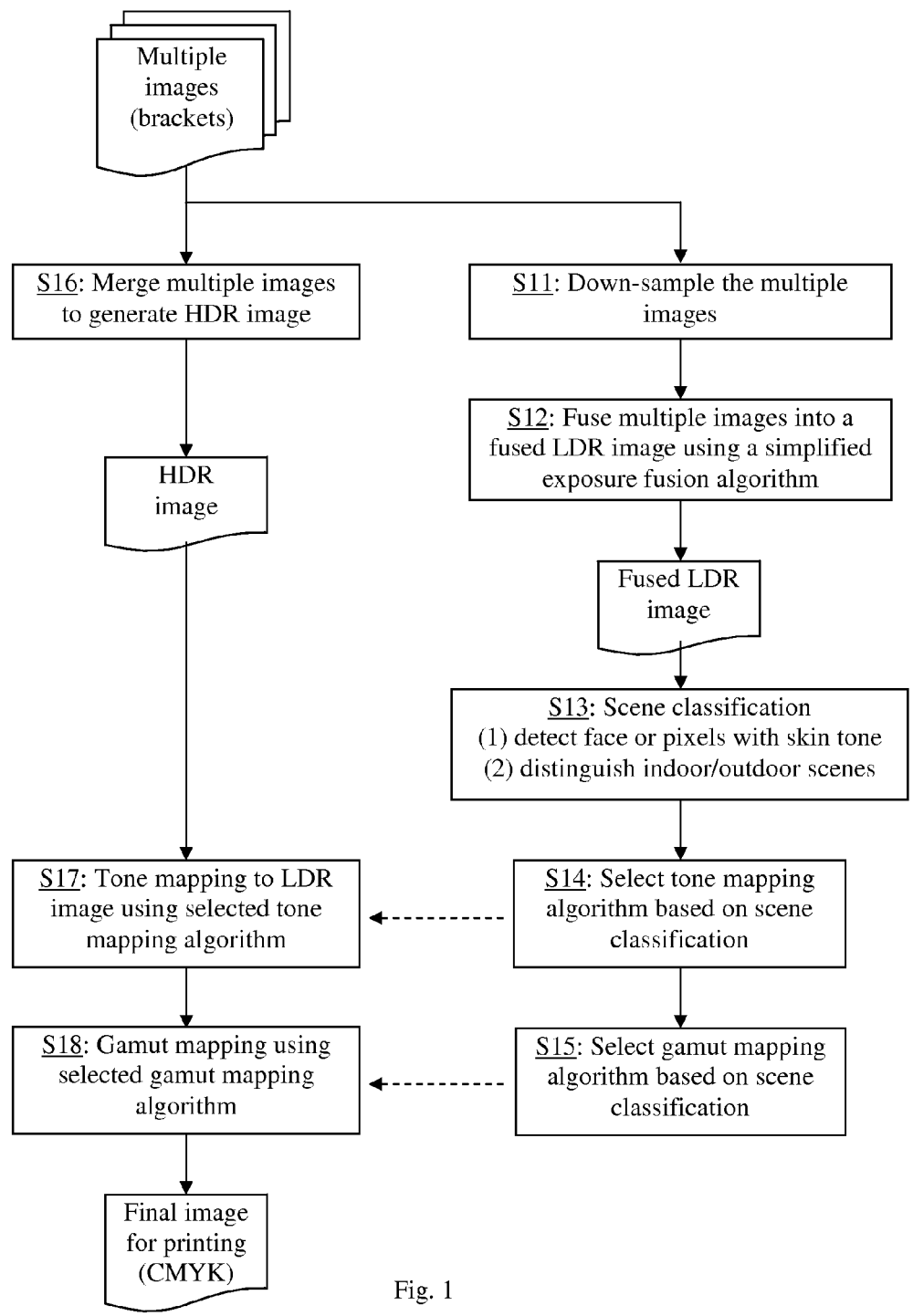
FIG. 1 schematically illustrates an HDR image processing method according to an embodiment of the present invention.

FIG. 1 schematically illustrates an HDR image processing method according to an embodiment of the present invention. The method is implemented in a data processing apparatus such as a computer, a digital camera, etc. The method receives as input a set of multiple images (brackets) taken of the same scene at various exposures. Pre-processing steps including image alignment and ghost removal have already been performed (not shown). The multiple brackets are merged to form an HDR image (step S16) using an HDR image generation algorithm. Any suitable HDR image generation algorithm can be adopted for this embodiment.

In the mean time, scene classification (steps S11-S13) is applied to classify the scene into one of a number of pre-recognized scene classes. First, each of the multiple images is down-sampled to generate a set of smaller images (step S11). Because images obtained by modern cameras typically have high pixel resolution, down-sampling improves performance without sacrificing scene classification accuracy appreciably. The down-sampling step is optional.

The multiple images are then fused into a fused LDR image using an exposure fusion algorithm (step S12). Exposure fusion is a technique for fusing or blending multiple exposure brackets directly into a single LDR image, without first generating an HDR image and then applying tone mapping. Exposure fusion can create an LDR image suitable for display (or printing) purposes that shows good exposure levels in both bright and dark areas of the scene. Exposure fusion processing is fast, but the quality of the LDR image generated not as high as that generated by tone mapping an HDR image. One exposure fusion method, described in T. Mertens, J. Kautz, and F. Van Reeth, Exposure Fusion, Proceedings of the Pacific Conference on Computer Graphics and Applications, Pacific Graphics 2007. Page 382-390 ("Mertens et al."), computes a perceptual quality measure for each pixel in each bracket, which represents desirable qualities such as saturation, contrast, and well-exposedness. This quality measure is used to construct a weight map for each bracket, which are used to combine the multiple brackets into the single LDR image. In the method described in the Mertens et al. article, additional techniques are applied to remedy problems caused by abrupt changes in the weight maps.

As described in the Mertens et al. article, an indicator for contrast can be calculated by applying a Laplacian filter to the grayscale version of each image and calculating the absolute value of the filter response. This contrast indicator tends to assign a high weight to important elements such as edges and texture. Saturation can be computed as the standard deviation within the R, G and B channel at each pixel. Saturated colors are desirable and make the image look vivid. A pixel is well exposed if its intensity is not near zero (underexposed) or one (overexposed). Well-exposedness can be measured by how close the intensity is to 0.5 using a Gauss curve or other curves.

In a preferred implementation of the present invention, a simplified exposure fusion algorithm is used in step S12, adapted from the Mertens et al. article by using only one of the quality parameters, e.g., saturation, or contrast, or well-exposedness, to generate the weight maps. This simplification improves speed without appreciably affecting scene classification accuracy. In an alternative implementation, multiple or all quality parameters described the Mertens et al. article, including saturation, contrast, and well-exposedness, are used in a combined manner to calculate the weight maps.

In one embodiment, all brackets in the set of multiple images are fused together in step S12 to generate the fused LDR image. In an alternative embodiment, in particular when the number of brackets in the image set is relatively large, a subset of brackets may be used to generate the fused LDR image. For example, if the image set contains seven exposure brackets, then three brackets (e.g., the second, fourth and sixth) may be used, or four brackets (first, third, fifth and seventh) may be used, etc. Thus, more generally stated, step S12 includes fusing a subset of the input multiple images, where the subset may be all or less than all of the input multiple images.

Scene classification is performed using the fused LDR image (step S13). In one particular embodiment, scenes are classified into three classes: outdoor scenes without a significant presence of people (referred to as outdoor scene for convenience in this disclosure), indoor scenes without a significant presence of people (referred to as indoor scene), and scenes that contain a significant presence of people (referred to as scene with people). In this embodiment, scene classification is performed by first detecting the presence of shapes having skin tones and/or faces in the image. Skin tones are a pre-define set of colors. In one implementation, if a skin-toned region with a face or limb-like shape is detected, the image is classified as a scene with people. In another implementation, if a significant number of image pixels (for example, 5% or more of the total pixels in the image) have skin tones, the image is classified as a scene with people. In another implementation, face detection or recognition techniques are used to detect faces in the image, to determine whether the scene is a scene with people. Any suitable face detection or recognition algorithm can be used here.

Then, the correlated color temperature (CCT) of the image is calculated to determine whether the scene is an indoor scene or an outdoor scene. CCT is a measure of light source color appearance; it is defined as the temperature of a blackbody radiator whose perceived color most closely resembles that of a given stimulus at the same brightness and under specified viewing conditions. One method for classifying indoor-outdoor scenes using CCT is described in A. Nadian Ghomsheh and A. Talebpour, A New Method for Indoor-outdoor Image Classification Using Color Correlated Temperature, International Journal of Image Processing (HIP), Volume (6), Issue (3), 2012, 167-181. This method divides the image into different color segments and CCT is found for each segment. These values form the image feature vector. Training vectors are used to train the scene classifier to classify the scenes into indoor and outdoor scenes (see pp. 170-171 of the article). The method described in this article may be used for scene classification in step S13.

The three scene classes described above are merely examples; in other embodiments, scenes may be classified into other classes, for example, night scenes and daylight scenes, generally dark scenes and generally bright scenes, etc. Night/daylight and dark/bright scenes may be classified by calculating a histogram of pixel intensities and detecting characteristic shapes of the histogram. For example, the histogram of a night scene will likely have two distinct peaks, with a majority of the pixels distributed at low lightness regions forming a high peak, and a small portion of the pixels distributed in high lightness regions forming a smaller peak. For dark image, most of pixels will likely be distributed at lower lightness region forming a single peak.

Based on the scene classification determined in step S13, a tone mapping operator is automatic selected to be used for processing the HDR image (step S14). In one embodiment, the selection of tone mapping algorithms is as follows: for outdoor scenes, the Drago tone mapping operator is selected; for indoor scenes, the iCAM06 tone mapping operator is selected; and for scenes with people (both outdoor and indoor), the Reinhard02 tone mapping operator is selected. If the scenes are classified into daylight/night or bright/dark scenes, then the Drago tone mapping operator may be used for daylight or bright scenes, the iCAM06 tone mapping operator may be used for night or dark scenes, while the Reinhard02 tone mapping operator may be used for scenes with people.

The above described correspondence between scene classes and tone mapping operators is merely an example; other tone mapping operators can be selected for various scene classes. Some other currently known tone mapping operators include Reinhard05 (see, e.g., E. Reinhard, K. Devlin, Dynamic Range Reduction Inspired by Photoreceptor Physiology, IEEE Transactions on Visualization and Computer Graphics, 2005, 11, 13-24), Durand (see, e.g., F. Durand and Julie Dorsey, Fast Bilateral Filtering for the Display of High-Dynamic-Range Images, ACM Transactions on Graphics, 2002, 21, 3, 257-266), Retina (see, e.g., Benoit A., Caplier A., Durette B., Herault, J., Using Human Visual System Modeling For Bio-Inspired Low Level Image Processing, Elsevier, Computer Vision and Image Understanding 114 (2010), pp. 758-773), etc. In alternative embodiments, one of these other tone mapping operators may be selected based on scene classification. Generally speaking, a correspondence between scene classes and the preferred tone mapping operators can be empirically determined, and a correspondence table between scene classes and tone mapping operators may be pre-stored in the data processing apparatus.

In addition (optional), based on the scene classification determined in step S13, a gamut mapping algorithm is automatic selected to be used for processing the image after tone mapping (step S15). For this purpose, multiple gamut mapping algorithms or multiple lookup tables pre-calculated with different gamut mapping algorithms are stored in the data processing apparatus, and a correspondence between scene classes and preferred gamut mapping algorithms is also pre-stored. Here, gamut mapping algorithms are deemed different if they use different formulae, or the same formula but different parameters, etc. The correspondence between scene classes and preferred gamut mapping algorithms can be determined manually based on experiments or by machine learning using training data.

Then, the HDR image generated in step S16 is tone-mapped into a LDR image by applying the tone mapping operator selected in step S14 (step S17). The LDR image is then gamut mapped using the gamut mapping algorithm selected in step S15 to generate an image for printing (step S18). Gamut mapping converts the image from one color space, in this case the color space of the camera (the input device), for example RGB, to another color space, in this case the color space of the printer (the output device), for example CMYK. Once the tone mapping operator and the gamut mapping algorithm are selected, steps S17 and S18 can be implemented by those skilled in the art without undue experimentation.

In the above described embodiment, a fused LDR image generated from multiple brackets is used for scene classification in step S13. In an alternative embodiment, scene classification is performed on a single bracket. For example, the middle bracket or the best exposed bracket (in terms of exposure value) in the set may be used. In this alternative embodiment, step S12 is omitted; instead, a step of selecting the middle bracket is performed. This alternative method is less preferred because, due to local over and/or underexposure, a single bracket often does not provide adequate detail information of all features within the scene. For example, a human face may be underexposed in the middle bracket. Therefore using a single bracket for scene classification may cause incorrect scene classification.

Figure 2A:
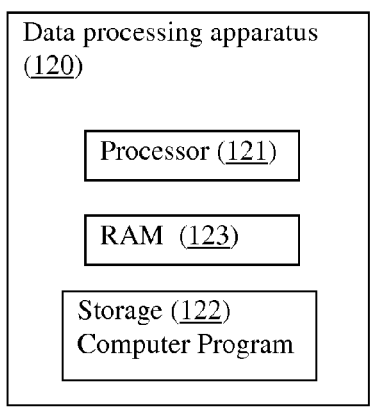
FIG. 2A schematically illustrates a data processing apparatus in which embodiments of the present invention may be implemented.

The HDR image processing method described above can be implemented in a data processing system such as a computer 120 as shown in FIG. 2A. The computer 120 comprises a processor 121, a storage device (e.g. hard disk drive) 122, and an internal memory (e.g. a RAM) 123. The storage device 122 stores software programs, which are read out to the RAM 123 and executed by the processor 121 to carry out the methods.

Figure 2B:
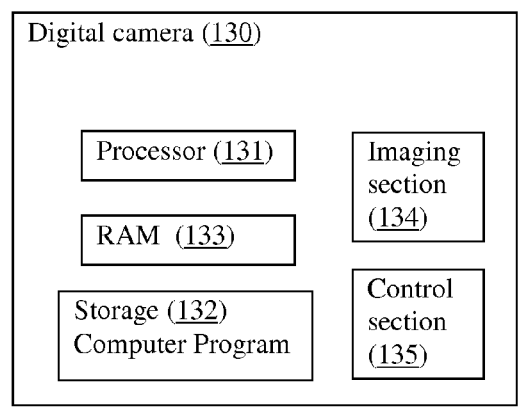
FIG. 2B schematically illustrates a digital camera in which embodiments of the present invention may be implemented.

The method may also be implemented in hardwired circuits, such as one or more chips within a digital camera. FIG. 2B schematically illustrates a digital camera 130, which includes a processor 121, a storage device 132, and an internal memory 133, as well as an imaging section 134 for obtaining images and a control section 135 for controlling the various functions of the camera. The control section 135 may perform autobracketing to automatically take a set of images at different exposure levels. Autobracketing is well known and its details are omitted here. The processor 131 may process the set of images using the algorithm described above to generate an HDR image.

In one aspect, the invention is embodied in a data processing apparatus, which may be the data processing section of a digital camera. In another aspect, the invention is a computer program product embodied in computer usable non-transitory medium having a computer readable program code embedded therein for controlling a data processing apparatus. In another aspect, the invention is a method carried out by a data processing apparatus.

It will be apparent to those skilled in the art that various modification and variations can be made in the HDR image processing method and related apparatus of the present invention without departing from the spirit or scope of the invention. Thus, it is intended that the present invention cover modifications and variations that come within the scope of the appended claims and their equivalents.

What is claimed is:

1. A method implemented in a data processing apparatus for processing a set of multiple input images of a scene taken at various exposure values, comprising:
   (a) using one or more of the multiple input images, classifying the scene into one of a plurality of scene classes, wherein the plurality of scene classes either include a class of scenes that contains a significant presence of people, a class of outdoor scenes and a class of indoor scenes, or include a class of scenes that contains a significant presence of people, a class of daylight scenes and a class of night scenes,
   wherein step (a) comprises:
      (a1) selecting a subset of two or more images from the multiple input images;
      (a2) down-sampling the selected images;
      (a3) after down-sampling, fusing the selected images into a single fused image, by generating a weight map for each selected image and combining the selected images using the weight maps, the weight maps being generated based on only one of saturation, contrast, and well-exposedness of each pixel in each selected image; and
      (a4) classifying the fused image into one of the plurality of scene classes;
   (b) based on the scene class determined in step (a), selecting one of a plurality of pre-stored tone mapping operators;
   (c) merging the multiple input images to generate a high dynamic range (HDR) image;
   (d) tone mapping the HDR image using the tone mapping operator selected in step (b) to generate a low dynamic range (LDR) image;
   (e) based on the scene class determined in step (a), selecting one of a plurality of pre-stored gamut mapping algorithms; and
   (f) using the gamut mapping algorithm selected in step (e), converting the LDR image generated in step (d) from a color space of the image to a color space of an output device.

2. The method of claim 1, wherein step (a4) comprises:
   detecting faces or areas having skin tones and predefined shapes in the fused image;
   if any face or area having skin tone and predefined shapes is detected, classifying the scene as a first class which is scenes with significant presence of people; and
   otherwise, classifying the scene as either a second class which is outdoor scenes or a third class which is indoor scenes by using correlated color temperatures of the fused image.

3. The method of claim 1, wherein step (a4) comprises:
   detecting faces or areas having skin tones and predefined shapes in the fused image;
   if any face or area having skin tone and predefined shapes is detected, classifying the scene as a first class which is scenes with significant presence of people; and
   otherwise, classifying the scene as either a second class which is daylight scenes or a third class which is night scenes using a histogram of pixel intensities of the fused image.

4. The method of claim 1, wherein the subset includes all of the multiple input images.

5. The method of claim 1, wherein the color space of the image is an RGB color space and the color space of the output device is a CMYK color space.

6. The method of claim 1, wherein the subset includes fewer than all of the multiple input images.

7. A computer program product comprising a computer usable non-transitory medium having a computer readable program code embedded therein for controlling a data processing apparatus, the computer readable program code configured to cause the data processing apparatus to execute a process for processing a set of multiple input images of a scene taken at various exposure values, the process comprising:
   (a) using one or more of the multiple input images, classifying the scene into one of a plurality of scene classes, wherein the plurality of scene classes either include a class of scenes that contains a significant presence of people, a class of outdoor scenes and a class of indoor scenes, or include a class of scenes that contains a significant presence of people, a class of daylight scenes and a class of night scenes,
   wherein step (a) comprises:
      (a1) selecting a subset of two or more images from the multiple input images;
      (a2) down-sampling the selected images;
      (a3) after down-sampling, fusing the selected images into a single fused image, by generating a weight map for each selected image and combining the selected images using the weight maps, the weight maps being generated based on only one of saturation, contrast, and well-exposedness of each pixel in each selected image; and
      (a4) classifying the fused image into one of the plurality of scene classes;
   (b) based on the scene class determined in step (a), selecting one of a plurality of pre-stored tone mapping operators;
   (c) merging the multiple input images to generate a high dynamic range (HDR) image;
   (d) tone mapping the HDR image using the tone mapping operator selected in step (b) to generate a low dynamic range (LDR) image;
   (e) based on the scene class determined in step (a), selecting one of a plurality of pre-stored gamut mapping algorithms; and
   (f) using the gamut mapping algorithm selected in step (e), converting the LDR image generated in step (d) from a color space of the image to a color space of an output device.

8. The computer program product of claim 7, wherein step (a4) comprises:
   detecting faces or areas having skin tones and predefined shapes in the fused image;
   if any face or area having skin tone and predefined shapes is detected, classifying the scene as a first class which is scenes with significant presence of people; and otherwise, classifying the scene as either a second class which is outdoor scenes or a third class which is indoor scenes by using correlated color temperatures of the fused image.

9. The computer program product of claim 7, wherein step (a4) comprises:
   detecting faces or areas having skin tones and predefined shapes in the fused image;
   if any face or area having skin tone and predefined shapes is detected, classifying the scene as a first class which is scenes with significant presence of people; and
   otherwise, classifying the scene as either a second class which is daylight scenes or a third class which is night scenes using a histogram of pixel intensities of the fused image.

10. The computer program product of claim 7, wherein the subset includes all of the multiple input images.

11. The computer program product of claim 7, wherein the color space of the image is an RGB color space and the color space of the output device is a CMYK color space.

12. A digital camera comprising the computer usable non-transitory medium of claim 7, the digital camera further comprising:
   an imaging section for obtaining images; and
   a control section for controlling the imaging section to obtain the set of multiple images having different exposure levels.

13. The computer program product of claim 7, wherein the subset includes fewer than all of the multiple input images.

* * * * *